UNITED STATES PATENT OFFICE.

ROBERT ELSBURY SAMS, OF ASHEVILLE, NORTH CAROLINA.

SALVE.

1,298,407. Specification of Letters Patent. Patented Mar. 25, 1919.

No Drawing. Application filed January 20, 1919. Serial No. 272,016.

*To all whom it may concern:*

Be it known that I, ROBERT ELSBURY SAMS, a citizen of the United States, residing in Asheville, in the county of Buncombe and State of North Carolina, have invented certain new and useful Improvements in Salves, of which the following is a specification.

This invention relates to medical preparations in the form of salves or ointments to be applied externally to the human body as a remedy for certain diseases and also in some cases as a preventive therefor.

The salve is especially intended as a remedy for catarrh, headache, tooth-ache, sorethroat, influenza, colds and kindred diseases, and in some cases it alleviates pain and in others tends to act as a preventive of the diseases above referred to.

A salve made in accordance with my invention consists of the following ingredients in substantially the proportions specified:

| Ingredient | Amount |
|---|---|
| Petroleum jelly | 16 oz. |
| Oil of penny-royal | ½ dram |
| Menthol (crystalline form) | 1 dram |
| Gum camphor | 2 oz. |
| Birch oil | ½ oz. |
| Sassafras oil | ½ oz. |

These ingredients are thoroughly mixed by putting them all in a vessel at once and heating the ingredients and at the same time stirring them until all ingredients are thoroughly dissolved and mixed. These ingredients should only be heated to a sufficient temperature to be thoroughly mixed and dissolved.

The amounts above specified are sufficient to produce a quart of the salve.

The salve is used or applied to the parts affected in the same manner as other salves.

I claim as my invention:—

A salve or ointment, consisting of petroleum jelly as a vehicle, gum camphor and smaller proportions of oil of pennyroyal, menthol, birch oil, and sassafras oil, all thoroughly mixed in approximately the proportions hereinbefore described.

In testimony whereof, I have hereunto subscribed my name.

ROBERT ELSBURY SAMS.